United States Patent
Misra et al.

(10) Patent No.: US 10,386,529 B2
(45) Date of Patent: Aug. 20, 2019

(54) SUBSURFACE ESTIMATION OF LEVEL OF ORGANIC MATURITY

(71) Applicant: Schlumberger Technology Corporation, Sugar Land, TX (US)

(72) Inventors: Siddharth Misra, Austin, TX (US); John Rasmus, Richmond, TX (US); Dean Homan, Sugar Land, TX (US); Carlos Torres-Verdin, Austin, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 216 days.

(21) Appl. No.: 14/944,312

(22) Filed: Nov. 18, 2015

(65) Prior Publication Data
US 2016/0139293 A1 May 19, 2016

Related U.S. Application Data
(60) Provisional application No. 62/081,812, filed on Nov. 19, 2014.

(51) Int. Cl.
*G01V 3/38* (2006.01)
*G01V 11/00* (2006.01)
(Continued)

(52) U.S. Cl.
CPC . *G01V 3/30* (2013.01); *G01F 1/74* (2013.01)

(58) Field of Classification Search
CPC .................................. G01F 1/74; G01V 3/30
See application file for complete search history.

(56) References Cited

U.S. PATENT DOCUMENTS
3,967,190 A 6/1976 Zonge
5,126,939 A 6/1992 Carpentier et al.
(Continued)

FOREIGN PATENT DOCUMENTS
WO WO2013155124 A1 10/2013
WO 2014055810 A 4/2014
WO 2014065790 A 5/2014

OTHER PUBLICATIONS
International Search Report issued in related PCT application PCT/US2015/061444 dated Feb. 3, 2016, 3 pages.
International Preliminary Report on Patentability issued in International Patent application PCT/US2015/061444, dated Jun. 1, 2017, 6 pages.
(Continued)

*Primary Examiner* — Mohammad K Islam

(57) ABSTRACT

A method for determining a level of organic maturity of a shale gas formation includes inverting multifrequency complex conductivity data to estimate a volume fraction of graphite, turbostatic carbon nanostructures, and pyrite. The inversion is validated using estimates of the volume fraction of graphite, turbostatic carbon nanostructures, and pyrite. The volume fraction of graphite and turbostatic carbon nanostructures is correlated to a level of organic maturity log of the shale gas formation. The level of organic maturity log is validated using sulfur content obtained from pyrolysis or vitrinite reflectance. A variation of an electromagnetic response due to the volume fraction of graphite, turbostatic carbon nanostructures, and pyrite is quantified. The electromagnetic response is modified by removing the quantified variation to obtain resistivity and permittivity values.

16 Claims, 14 Drawing Sheets

(51) Int. Cl.
*G01V 3/30* (2006.01)
*G01F 1/74* (2006.01)

(56) References Cited

U.S. PATENT DOCUMENTS

| | | | | |
|---|---|---|---|---|
| 6,819,111 B2* | 11/2004 | Fanini | | G01V 3/28 |
| | | | | 175/45 |
| 8,333,245 B2* | 12/2012 | Zupanick | | E21B 43/305 |
| | | | | 166/370 |
| 8,729,903 B2 | 5/2014 | Srnka et al. | | |
| 9,856,731 B2* | 1/2018 | Scott | | E01B 49/00 |
| 2004/0100263 A1* | 5/2004 | Fanini | | G01V 3/28 |
| | | | | 324/339 |
| 2004/0108110 A1* | 6/2004 | Zupanick | | B65G 5/00 |
| | | | | 166/245 |
| 2007/0061082 A1* | 3/2007 | Seleznev | | G01V 3/26 |
| | | | | 702/11 |
| 2009/0084534 A1* | 4/2009 | Zupanick | | E21B 43/006 |
| | | | | 166/50 |
| 2009/0242196 A1* | 10/2009 | Pao | | E21B 3/2401 |
| | | | | 166/248 |
| 2009/0254283 A1 | 10/2009 | Jacobi et al. | | |
| 2010/0000792 A1* | 1/2010 | Alberty | | E21B 47/026 |
| | | | | 175/50 |
| 2011/0278382 A1* | 11/2011 | Moeny | | B02C 19/18 |
| | | | | 241/1 |
| 2012/0095687 A1 | 4/2012 | LeCompte | | |
| 2012/0168177 A1* | 7/2012 | Moeny | | E21B 7/15 |
| | | | | 166/380 |
| 2012/0312090 A1 | 12/2012 | Klein et al. | | |
| 2014/0209312 A1* | 7/2014 | Munisteri | | B01D 21/34 |
| | | | | 166/308.1 |
| 2015/0012251 A1* | 1/2015 | Horne | | G01V 1/306 |
| | | | | 703/2 |
| 2016/0024904 A1* | 1/2016 | Zupanick | | E21B 43/006 |
| | | | | 166/50 |
| 2016/0187521 A1 | 6/2016 | Homan et al. | | |

OTHER PUBLICATIONS

Dukhin et al., Dielectric Phenomena and Double Layer in Disperse Systems and Polyelectrolytes, Published Naukova Dumka, Kiev 1972; Journal of the Electrochemical Society, Apr. 1974, p. 154c.

Grissemann, Christof, Examination of the Frequency-Dependent Conductivity of Ore-Containing Rock on Artificial Models, University of Innsbruck, Austria, Jul. 15, 1971, 34 pages.

Grosse et al., On the Decomposition of the Maxwell mixture formula into a sum of Bebye type contributions, Journal of Physics D: Applied Physics, vol. 19, 1986, pp. 1957-1964.

Grosse et al., Influence of Bulk Diffusion on the Counterion Polarization in a Condensed Counterion Model, Journal Physical Chemistry, 1987, vol. 91, pp. 6415-6417.

Holdren et al. Mechanism of feldspar weathering—1. Experimental Studies, Geochimica et Cosmochimica Acta, vol. 43, pp. 1161-1171, 1979.

Klein et al., Electrical properties of artificial clay-bering sandstone, Geophysics, vol. 47, No. 11, Nov. 1982, pp. 1593-1605.

Meyer et al., Identification of Source Rocks on Wireline Logs by Density/Resistivity and Sonic Transit Time/Resistivity Crossplots, The American Association of Petroleum Geologists Bulletin, vol. 68, No. 2, Feb. 1984, pp. 121-129.

Passey et al., A Practical Model for Organic Richness from Porosity and Resistivity Logs, The American Association of Petroleum Geologists Bulletin, vol. 74, No. 12, Dec. 1990, pp. 1777-1794.

Pelton et al., Mineral Discrimination and Removal of Inductive Coupling with Multifrequency IP, Geophysics, vol. 47, No. 3, Apr. 1978, pp. 588-609.

Witkowsky et al., Predicting Pyrite and Total Organic Carbon from Well Logs for Enhancing Shale Reservoir Interpretation, SPE 161097, SPE Eastern Regional Meeting, Lexington, KY, USA, Oct. 3-5, 2012, 14 pages.

Wong, J., An electrochemical model of the induced-polarization phenomenon in disseminated sulfide ores, Geophysics, vol. 44, No. 7, Jul. 1979, pp. 1245-1265.

\* cited by examiner

SUBSURFACE ESTIMATION OF LEVEL OF ORGANIC MATURITY

CROSS-REFERENCE TO RELATED APPLICATIONS

This application claims the benefit of a related U.S. Provisional Patent Application having Ser. No. 62/081,812, filed Nov. 19, 2014, titled "Subsurface Estimation of Level of Organic Maturity Using Multifrequency Complex Conductivity Measurements In MHz to MHz Frequency Range," to John Rasmus et al., the disclosure of which is incorporated by reference herein in its entirety.

FIELD

This disclosure relates to the field of laboratory whole core analysis as well as the field of well logging.

BACKGROUND

Level of organic maturity ("LOM") is a parameter used in the assessment of the commercial value of a shale reservoir. LOM impacts interstitial fluids, production limits, pore pressure, and reservoir quality. One indicator of LOM is vitrinite reflectance, which is measured in a laboratory.

The presence of pyrite, graphite, and turbostatic carbon nanostructures ("TCN") produces interfacial polarization that results in frequency-based dispersion of effective electrical properties of shale formations. Locating a concurrence of favorable geologic parameters such as thermal history, gas content, reservoir thickness, fractures, rock composition, total organic carbon ("TOC"), porosity, permeability, free and sorbed gases, water saturations, and thermal maturity assists in finding gas shale reservoirs. Gas is stored interstitially within pore spaces between rock grains, fractures, or kerogen, or it can be adsorbed to the surface of organic components contained within the shale. Kerogen is categorized into four broad groups, each of which has distinct bearing on what type of hydrocarbons will be produced. Type 2 kerogen is generated from the remains of planktons in reducing environments found in moderately deep marine settings. Sulfur is associated as pyrite, free sulfur, or in the organic structure of kerogen. Type 3 kerogen is primarily derived from terrestrial plant debris that has been deposited in shallow to deep marine or non-marine environments. Type 3 kerogen may generate dry gas, as it has lower hydrogen and oxygen content. Marine shale facies contain type 2 and type 3 blends. Heat and time convert organic material to hydrocarbons. Temperature and pressure increase during burial, resulting in organic material giving off oil and gas. Diagenesis refers to the low-temperature alteration of organic material due to oxidation, chemical processes, and biological processes. With increases in temperature and changes in pH, organic material is converted into kerogen and lesser amounts of bitumen. Pyritization occurs during the diagenesis phase when sulfate-reducing bacterial colonies sulfate in sea water to biodegrade organic material. Hydrogen sulfide and native sulfur released by these bacteria combine with iron in clays to form pyrites (FeS2). Catagenesis causes chemical bonds to break down in shale and the kerogen. Oil is produced from type 1 kerogen, waxy oil is produced from type 2 kerogen, and gas is produced from type 3 kerogen. Pyrite and marcasite are two sulfides in iron-rich sedimentary rocks: black shale and coal, respectively. Many shale reservoirs contain up to 10 wt % of pyrite and TOC that amount up to 7% pyrite and up to 20% kerogen by volume.

Shale formations may contain 12% to 15% kerogen volume. Spectral elemental analysis using geochemical logs is used to solve for the elements present in the formation. However, the volume of kerogen cannot be determined with spectral tools due to the presence of carbon in various other minerals. The Passey method is designed for use in the evaluation of organic content of hydrocarbon source rocks. The method uses knowledge of the maturity of the organic material, and is less accurate for sediments that are overmature, such as shale gas formations. Frequently, layers including a higher organic content are interspersed with layers of lower organic content or conductive minerals resulting in dielectric anisotropy that adversely affects the resistivity interpretation. Therefore, laboratory measurements of thermal maturation is another method and includes measurements of thermal indicators such as vitrinite reflectivity, LOM, spore color index, conodont alteration, sulfur content, hydrogen index, and pyrolysis byproducts. Vitrinite is a good indicator of the maximum temperature that a shale has been exposed to but some shales do not contain vitrinite.

Electrical conductivity values in the induction tool frequency range, and permittivity values in the propagation tool frequency range, are estimated using existing resistivity interpretation techniques to primarily evaluate water saturation in a conventional geological sample or the geological formation. The effects of pyrite, graphite, and other constituent minerals are not included in the resistivity interpretation for shale gas characterization. Source rocks are commonly shales and lime-mudstones that contain large amounts of organic matter. Richness and maturity of source rocks is evaluated through a variety of laboratory analyses like TOC analysis, pyrolysis, elemental analysis, vitrinite reflectance, thermal alteration index, gas chromatography, and visual kerogen description.

SUMMARY

The proposed method of subsurface estimation of LOM as a continuous realtime well log may be used for directional drilling and well placement in shale, organic-rich mudrock, and source-rock reservoirs. A drilling engineer and well placement engineer may use the continuous assessment of LOM to ensure that the wellbore stays in the geological formation with the highest LOM, thereby improving exposure of the wellbore to hydrocarbon reserves.

The proposed method of subsurface estimation of LOM as a continuous realtime well log may enable directional drillers and well placement engineeers to steer away from overmature rocks containing graphite and turbostatic carbon and to stay within pyrite-rich hydrocarbon-bearing rocks. The proposed method of subsurface estimation of LOM as a continuous well log may also enable reservoir engineers to plan lateral wells into zones rich in mature organics and avoid overmature zones. The proposed method of subsurface estimation of LOM as a continuous realtime well log may also provide extra geological information for accurate well placement.

In one embodiment, a method disclosed herein includes characterizing the type of shale gas reservoirs. The method also includes estimating of volume fractions of electrically-active sites such as pyrite, graphite, pyrrhotite, and recently-discovered turbostatic carbon nanostructures that produce electrochemically-inactive interfacial polarization effects in the 1 kHz to 10 MHz frequency range. The method also includes identifying the LOM of a shale gas reservoir. The method also includes improving resistivity interpretations in shale gas reservoirs for improved TOC estimation.

A method to obtain a continuous estimation of LOM, to improve TOC estimation based on delta-log-R method, and to classify the shale gas formations based on the complex conductivity dispersive response based on multi-frequency complex conductivity measurement is disclosed. This method uses a characterization of TOC and LOM of source rock either as a standalone measurement or in conjunction with other wireline log or laboratory measurements such a nuclear spectroscopy tools. The method is based on quantification of various types of dielectric polarization phenomena occurring in a geological material within MHz to GHz frequency range. This includes surface conduction and membrane polarization (clay, <1 kHz), electrochemical spectral induced polarization (clay and other minerals, <1 kHz), metallic interfacial polarization (conductive minerals in absence of redox-active ions, 1 kHz to 10 MHz), Maxwell-Wagner polarization (interstitial pore structure, 500 KHz to 100 MHz), dipolar polarization (pore fluids, includes orientation and distortion polarization, >10 MHz), and ionic polarization. This method can be also implemented for gathering additional information for laboratory diagnosis of LOM. Existing resistivity tools may utilize excitation frequencies from near-DC like galvanic resistivity tools. For example, the frequency may range from 0 Hz (e.g., near-DC) to 100 Hz. Existing resistivity tools may utilize excitation frequencies from very high frequency dielectric tools operating in the GHz range. For example, the frequency may range from 10 MHz to 1 GHz or more. This may aid in determining the TOC.

In one embodiment, a method for determining a level of organic maturity of a shale gas formation includes inverting multifrequency complex conductivity data to estimate a volume fraction of graphite, turbostatic carbon nanostructures, and pyrite. The inversion of the multifrequency complex conductivity data may be validated using estimates of the volume fraction of graphite, turbostatic carbon nanostructures, and pyrite. The volume fraction of graphite and turbostatic carbon nanostructures may be correlated to a level of organic maturity log of the shale gas formation. The level of organic maturity log may be validated using sulfur content obtained from pyrolysis or vitrinite reflectance. The method may also include quantifying a variation of an electromagnetic response due to the volume fraction of graphite, turbostatic carbon nanostructures, and pyrite. The electromagnetic response may be modified by removing the quantified variation to obtain resistivity and permittivity values.

A computing system is also disclosed. The computing system includes a processor and a memory system including a non-transitory computer-readable medium storing instructions that, when executed by the processor, causes the computing system to perform operations. The operations include inverting multifrequency complex conductivity data to estimate a volume fraction of graphite, turbostatic carbon nanostructures, and pyrite. The inversion of the multifrequency complex conductivity data may be validated using estimates of the volume fraction of graphite, turbostatic carbon nanostructures, and pyrite. The volume fraction of graphite and turbostatic carbon nanostructures may be correlated to a level of organic maturity log of the shale gas formation. The level of organic maturity log may be validated using sulfur content obtained from pyrolysis or vitrinite reflectance. The operations may also include quantifying a variation of an electromagnetic response due to the volume fraction of graphite, turbostatic carbon nanostructures, and pyrite. The electromagnetic response may be modified by removing the quantified variation to obtain resistivity and permittivity values.

Other aspects and advantages of the claimed subject matter will be apparent from the following description and the appended claims.

DETAILED DESCRIPTION

Figure 1A:
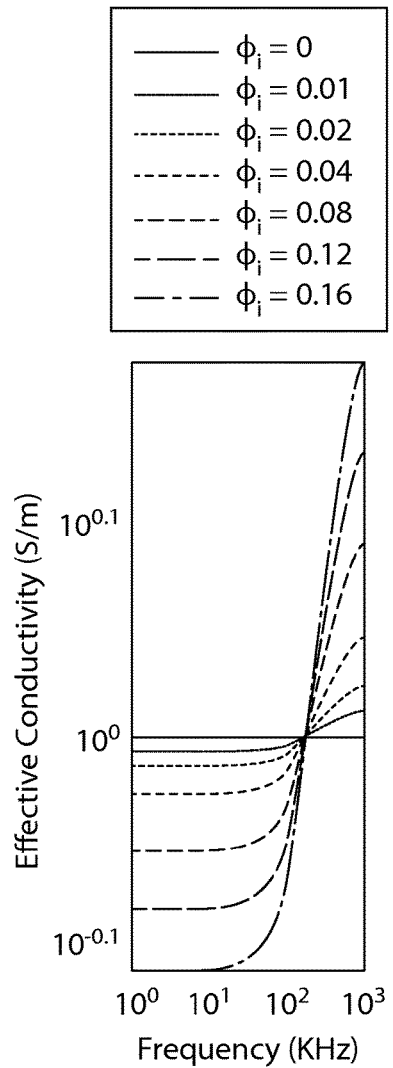
FIGS. 1A and 1B illustrate graphs depicting the relationship of effective conductivity and effective dielectric constants with volume fractions on inclusions based on an embodiment of an analytical model for interfacial polarization disclosed herein.

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nonetheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

A method based on multifrequency complex conductivity tensor measurements and modeling of polarization phenomena in shale gas formation is disclosed. For purposes of demonstration of this method, this discussion will focus on electrochemically-inactive interfacial polarization. The method relates to formation evaluation and petrophysical interpretation. More particularly, the method relates to formation evaluation in gas shale and oil-bearing shale reservoirs. The method also relates to techniques for evaluating a subterranean shale gas, shaly sand formations, and whole core samples to identify and quantify LOM and TOC.

This method is used to identify and quantify the volume fraction of minerals associated with organic matter, thereby indicating the organic richness and maturity. In clay-rich source rock, mineral grains align horizontally, and organic matter is distributed in sub-horizontal lamellae. In carbonate source rocks, matrix grains don't have a specific orientation, and such rocks are laminated with organic rich and organic-lean layers. In this methodology, the geological samples are assumed to be composed of a non-dispersive, non-dielectric, and non-conductive rock matrix, dispersive, dielectric, and conductive rock minerals, organic matter, and fluids filling the pore space. Immature source rocks are conductive due to water-filled pore space, and have non-dispersive R-signals. Such rocks have dielectric and dispersive X-signals when pyrite minerals, a product of diagenesis during early phase of maturation, are present. Over-matured rocks are conductive due to the presence of graphite due to excessive graphitization, and both the R-signal and X-signal are dispersive. While matured source rocks are non-conductive due to the presence of hydrocarbon-filled pore space, they can be slightly conductive due to presence of graphite, which is a product of metagenesis. As source rock matures, a portion of solid organic matter is transformed to liquid and part to graphite or other precursors which increase in conductivity and dispersive R-signal response. Increases in the depth of burial and temperature may result in maturation of shale gas source rock, which may result in the formation of pyrite due to the presence of organic material and graphite from graphitization of kerogen material. Pulsed-neutron spectral logs can provide carbon-oxygen neutron logs that help in evaluating TOC content.

This method may use a subsurface diagnostic tool for assessing the maturation of source rock. With increases in maturation, graphite concentration increases as bonds are broken and hydrogen and oxygen is expelled from the source rock with graphitic pyrobitumen. Thermogenic shale gas reservoir properties may be present in post-mature Marcellus shale gas prospects (e.g., the Laughrey Ruble Black shale diagenesis). Late-stage methane during metagenesis may be present. Since graphite is a paleothermometer, and pyrite is an indicator of the presence of initial organic material, the concentrations of these minerals can be correlated to hydrocarbon presence, source rock maturation, and hydrocarbon generation. A calibration with core analysis for LOM and TOC may then be conducted. This calibration may be used to provide a more accurate well placement and to enhance directional drilling.

Shale gas is produced from formations that are heterogeneous, but kerogen maturity follows a relationship with depth of burial, temperature, and pressure. As a general description, type 1 is algal, type 2 is liptinitic, type 3 is humic kerogen, while type 4 contains small amounts of H-atom due to aromaticity of carbon and higher amounts of oxygen compared to type 1. Graphite can form an interconnected thin film around the grains by metagenesis of C—O—H fluids. Geologic energy on organic deposits may produce many types of natural graphites, such as flake and amorphous.

A mechanistic model may be implemented with a conductivity tensor tool forward model to differentiate between metallic-luster minerals, graphites, and clays. Modeling of interfacial polarization can be done using circuit models, empirical models, phenomenological models, or mechanistic models. A physically consistent model satisfies the Kronig-Kramers relationship. Some of the analytical models are built for cases when dispersed phases do not interact with each other. As a result, a single element is analyzed, and an effective medium formulation to the entire mixture is applied.

Conductive minerals such as pyrite, pyrrhotite, and graphite commonly occur in source rocks and shale reservoirs. Also, isolated conductive turbostatic carbon nanostructures, whose volume fraction increases with increasing thermal maturity, have been found in organic-rich shales. These electrically-active phases in the absence of redox-active ions, possess electrochemically-inactive phases and boundaries, and the resulting geological mixture exhibits large dielectric polarization referred to as interfacial polarization. During this phenomenon, there may be spatiotemporal variation of dynamics and distribution of charge carriers around the phase boundary. Therefore, the electromagnetic ("EM") response of shale reservoir rocks may be influenced by the electrical properties of these electrically-active phases and electrodiffusion processes. As a consequence, the EM response may provide an inaccurate hydrocarbon saturation estimation based on conventional resistivity interpretation techniques. Analytical modeling techniques have been developed and numerical modeling schemes implemented to understand and quantify this phenomenon. An EM whole core induction tool ("WCIT") was developed to study interfacial polarization, in the 10 kHz to 300 kHz frequency range, of artificial whole cores containing either dispersed or layered phases of pyrite and/or graphite. An inversion scheme based on a Cole-Cole empirical model coupled with a TILTECC-forward model of the WCIT response was developed to quantify interfacial polarization effects on WCIT complex conductivity measurements on whole cores. The measurements on whole cores can be subsequently used to improve resistivity interpretation of subsurface conductivity and dielectric measurements in shale formations. A mechanistic model of charge accumulation and relaxation around the electrically-active phases uniformly dispersed in a medium was also developed.

Figure 1B:
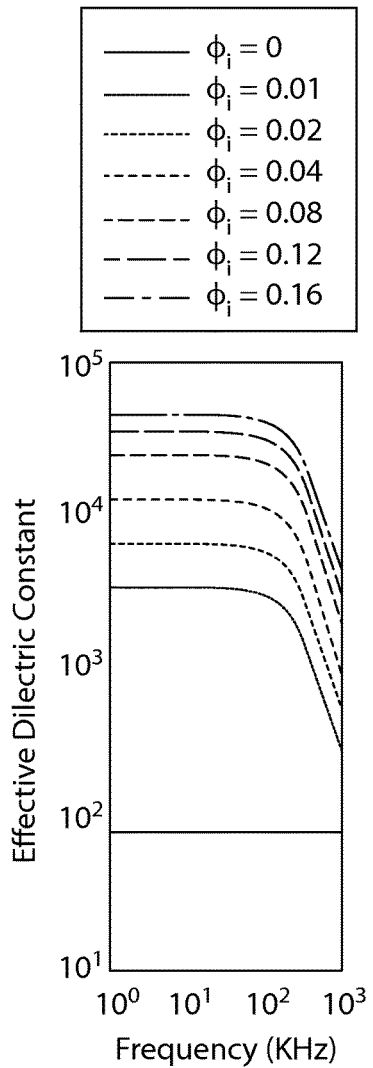
Figure 2B:
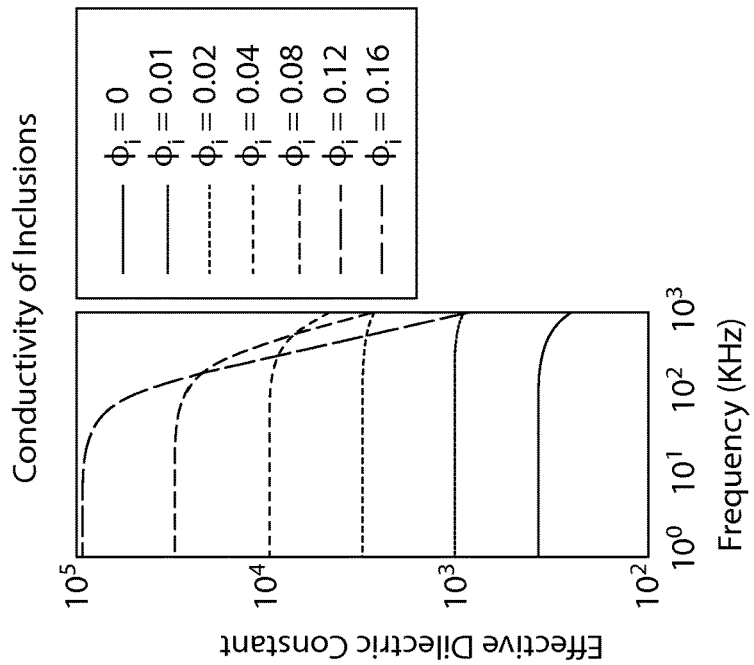
FIGS. 2A and 2B illustrate graphs depicting the relationship of effective conductivity and effective dielectric constants with conductivity of the inclusions based on an embodiment of an analytical model for interfacial polarization disclosed herein. This model is used within a frequency range from about 1 kHz to about 10 MHz and assumes negligible spectral induced polarization of surrounding clay materials.
Figure 2A:
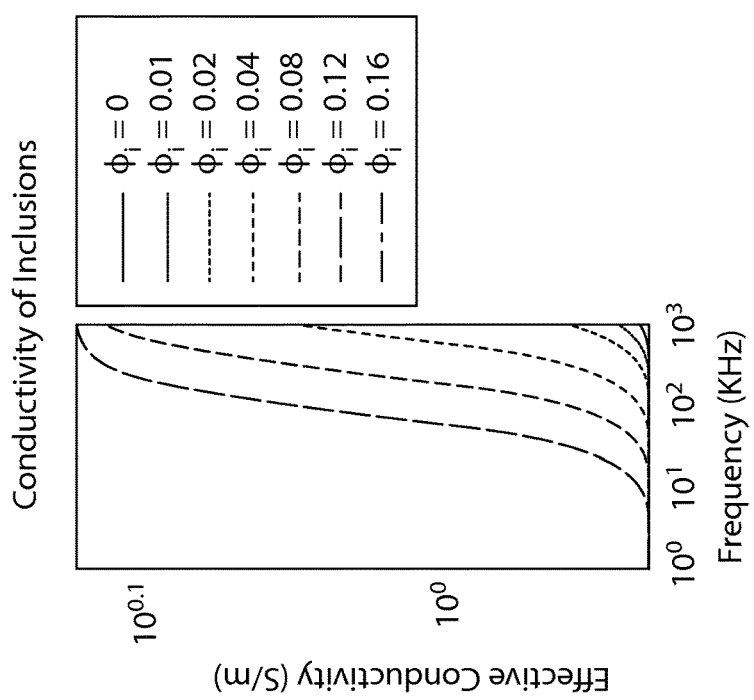

FIGS. 1A and 1B illustrate graphs depicting the relationship of effective conductivity and effective dielectric constants with volume fractions on inclusions based on an embodiment of an analytical model for interfacial polarization disclosed herein. FIGS. 2A and 2B illustrate graphs depicting the relationship of effective conductivity and effective dielectric constants with conductivity of the inclusions based on an embodiment of an analytical model for interfacial polarization disclosed herein. This model is used within a frequency range from about 1 kHz to about 10 MHz and assumes negligible spectral induced polarization of surrounding clay materials. A method for determining some of the shale gas reservoir properties includes exciting the reservoir with an EM exciting field, measuring the EM signal produced by the exciting field, extracting, from the measured EM signal, a spectral complex resistivity as a function of frequency, fitting the spectral complex resistivity with an interfacial polarization model ("IP model"), and deducing the formations properties from fitting with the IP model. The content of metallic inclusions can be determined. This method can be applied to any type of EM data including, but not limited to, borehole measurements, crosswell surveys, and surface surveys. Complex resistivity is defined as $1/(\sigma+j\omega\varepsilon)$. The inversion of EM surveys has been used to determine and map the real part of complex formation resistivity with the aim of inferring the saturation distribution in the reservoir. One aim of an embodiment of the present disclosure is to determine petrophysical information using complex resistivity data. Understanding complex formation resistivity behavior as a function of frequency helps to correct the real part of the resistivity for the dispersion effects, that otherwise would be interpreted as a change of the formation resistivity. The dielectric permittivity and conductivity dispersion can be determined as a function of the mineral content and composite rock conductivity. Separation of opposite charges across a conductive/non-conductive medium results in polarization and a high dielectric constant. At high frequencies, the dielectric constant is small due to insufficient time to polarize. The dielectric permittivity and conductivity measurements described were made at room temperature by measuring the induced voltage and energizing current in Rt Core apparatus disclosed in patent application No. 62/038,765 (from which U.S. Publication 2016/0187521 claims priority), entitled "Multi-frequency Inductive-Conductivity Tool and Petrophysical Interpretation for Electrically-Dispersive Formations," which is incorporated by reference herein in its entirety.

Modified Petrophysical Model

Various mathematical models of accumulation and relaxation of space charges around interfaces have been developed for applications in colloidal, electrochemical, microfluidic, and geophysical sciences. A phase boundary has the tendency to acquire a surface charge due to ionic adsorption, protonation/deprotonation, dissociation of a surface chemical group, or external applied field. A net surface charge may lead to a counterion cloud and diffused-charge distribution around the interface. In the presence of an electric field, the equilibrium charge distribution around the interface may be perturbed. Conduction and diffusion processes may occur over a certain time (e.g., the relaxation time) to attain a new equilibrium state. The dynamics and distribution of charge carriers around the interface may influence the electromagnetic response of a geological mixture. Consequently, electromigration, electrodiffusion, and electrochemical processes occurring at the phase boundaries may be quantified for accurate resistivity interpretation in formations susceptible to large interfacial polarization phenomena. A mechanistic model of interfacial polarization of a geological mixture containing electrochemically-inactive phase boundaries has been developed. Therefore, in the unperturbed condition, the model disclosed herein assumes a negligible surface charge, counterion cloud, and diffused charge distribution around the interface. In the absence of redox-active ions, pyrite-bearing sedimentary rocks and graphite-bearing thermogenic source rocks may demonstrate interfacial polarization phenomena. The new model developed for petrophysical application is based on Poisson-Nernst-Planck ("PNP") equations for a diluted solution in a weak electrical field regime. PNP equations may be more realistic compared to circuit models that assume invariant uniform bulk concentration of charge carriers. Using PNP equations, the dipole moment due to a single, isolated dispersed phase particle may be determined. A consistent effective medium formulation is employed to determine effective complex conductivity of the geological mixture. This new model may be valid for a dispersed phase that has a representative length<1 mm, conductivity<100 S/m, relative permittivity<10, and volume fraction<0.3. Analytical modeling results are demonstrated below.

Forward Modeling

Figure 3B:
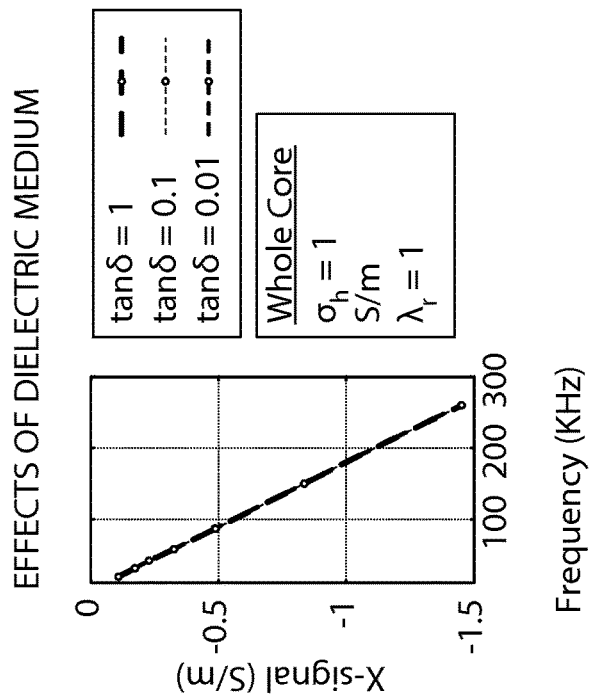
FIGS. 3A and 3B illustrate graphs showing R-signal and X-signal responses, respectively, based on an embodiment of a forward modeling technique for quantifying effects of interfacial polarization disclosed herein. This method includes empirical modeling and modeling of finite coil responses of an electromagnetic ("EM") tool.
Figure 3A:
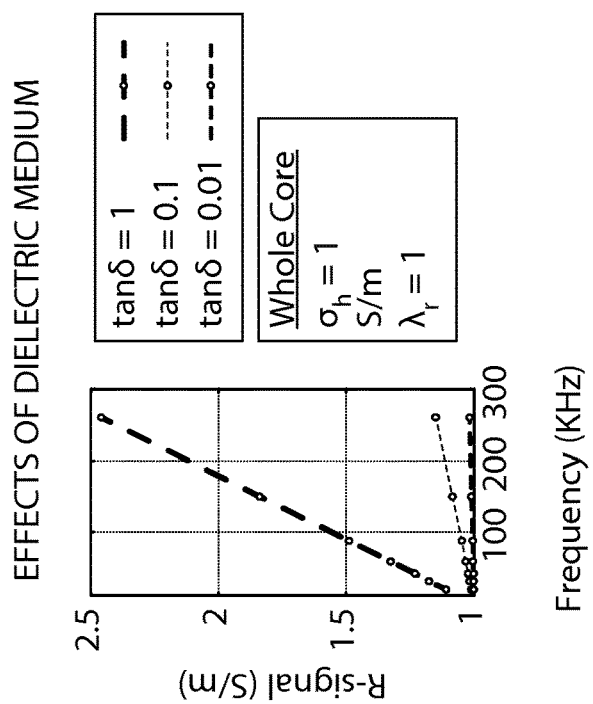
Figures 4A, 4B:
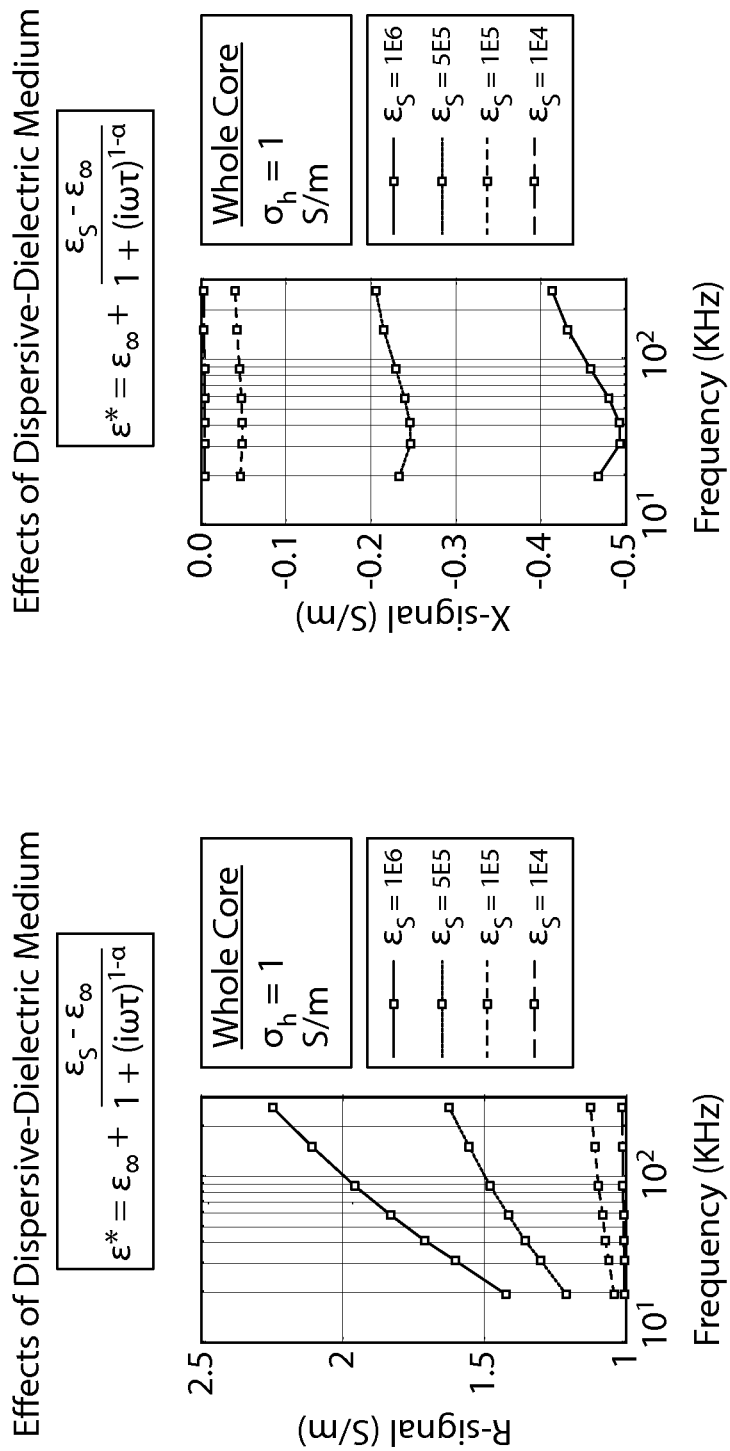
FIGS. 4A and 4B illustrate graphs showing R-signal and X-signal responses to variations in static permittivity of a medium based on an embodiment of a forward modeling technique for quantifying effects of interfacial polarization disclosed herein.
Figures 5A, 5B:
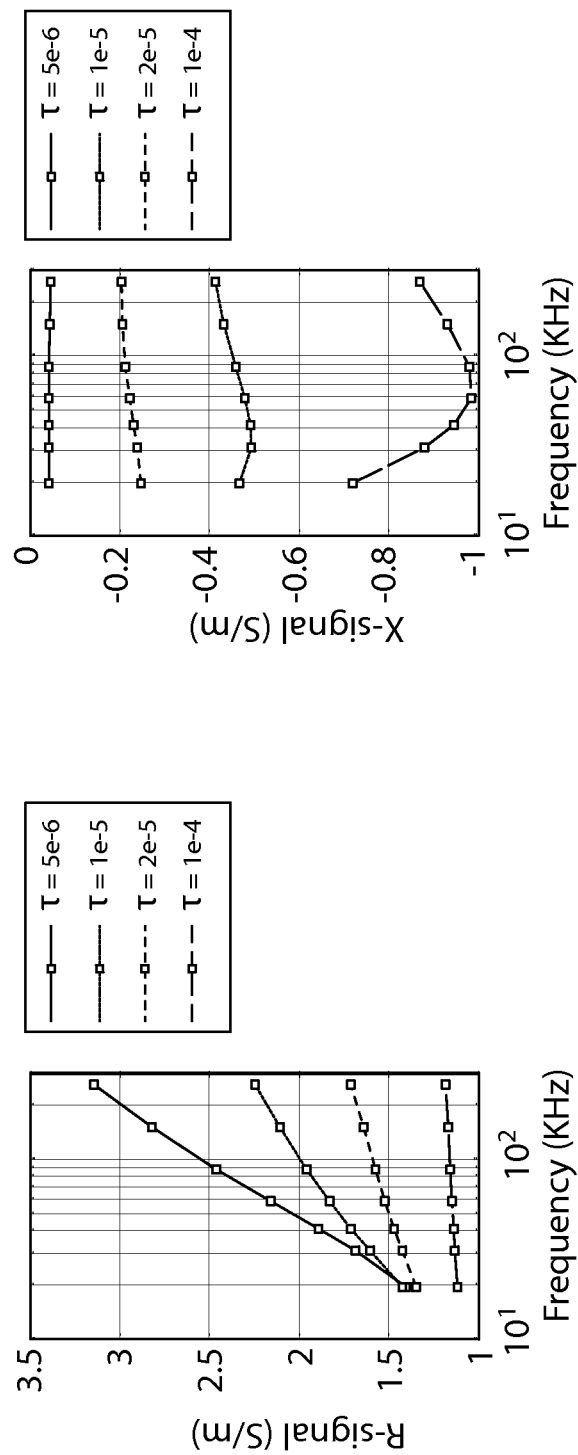
FIGS. 5A and 5B illustrate graphs showing R-signal and X-signal responses to variations in a time constant based on an embodiment of a forward modeling technique for quantifying effects of interfacial polarization disclosed herein.

FIGS. 3A and 3B illustrate graphs showing R-signal and X-signal responses, respectively, based on an embodiment of a forward modeling technique for quantifying effects of interfacial polarization disclosed herein. This method includes empirical modeling and modeling of finite coil responses of an electromagnetic ("EM") tool. FIGS. 4A and 4B illustrate graphs showing R-signal and X-signal responses to variations in static permittivity of a medium based on an embodiment of a forward modeling technique for quantifying effects of interfacial polarization disclosed herein. FIGS. 5A and 5B illustrate graphs showing R-signal and X-signal responses to variations in a time constant based on an embodiment of a forward modeling technique for quantifying effects of interfacial polarization disclosed herein.

An inversion scheme based on a Cole-Cole empirical model coupled with a TILTECC-forward model of a WCIT response to quantify EIP effects on WCIT complex conductivity measurements on whole cores was developed. These can be subsequently used to improve resistivity interpretations of subsurface conductivity and dielectric measurements in shale formations. This inversion scheme based on the interfacial polarization model, when coupled with a consistent forward model, may remove interfacial polarization effects from the tool's EM response and thus improve the resistivity interpretation. The level of organic maturity can be assessed by selectively estimating the volume fraction of graphite and its precursors using this inversion scheme. The proposed method facilitates the use of broadband conductivity tensor tools for geophysical applications. Without this method, geophysical applications of multifrequency conductivity tool measurements may be less reliable. This method may help completion engineers to design efficient completion plans that result in targeted fracturing of sweet spots.

The site of polarization in rocks implies the existence of space charge inhomogeneties and electrochemical potentials. The space charge inhomogeneties may cause a gradient of electrical field, and the electrochemical potentials result in local sources of electromotive forces. Colossal dielectric constant phenomena was observed with a constant low frequency value. There may be a loss peak in the imaginary part of the permittivity. Petrophysical interpretation using Cole-Cole empirical model is based on an understanding the relationship of EM response and the governing petrophysical parameters. Factors in the chargeability of earth material may include:

The grain size of particles in the sample;
The types of minerals present in matrix;
The distribution pattern of these minerals veins, disseminated, massive;
The type and mobility of ions within the pore fluids;
The microscopic interaction of solid surfaces and fluids;
The amount of surface area within specific volume; and
The total pore space and geometrical distribution of pores.

Figure 6B:
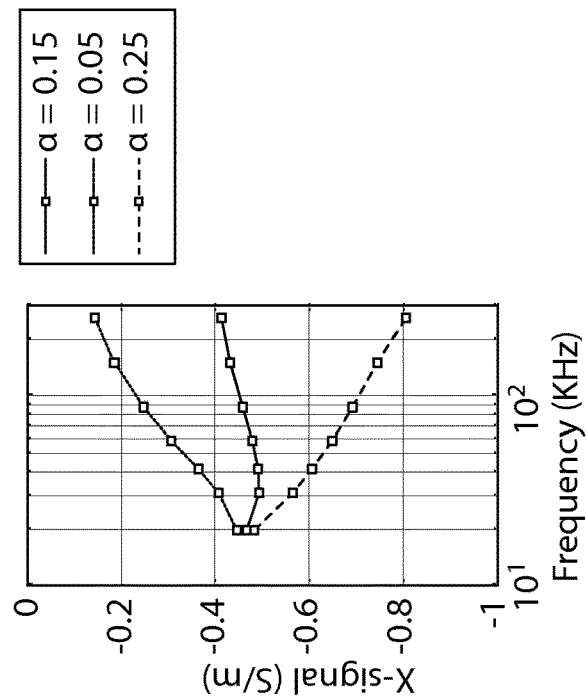
FIGS. 6A and 6B illustrate graphs showing R-signal and X-signal responses to variations in frequency dispersion parameters based on an embodiment of a forward modeling technique for quantifying effects of interfacial polarization disclosed herein.
Figure 6A:
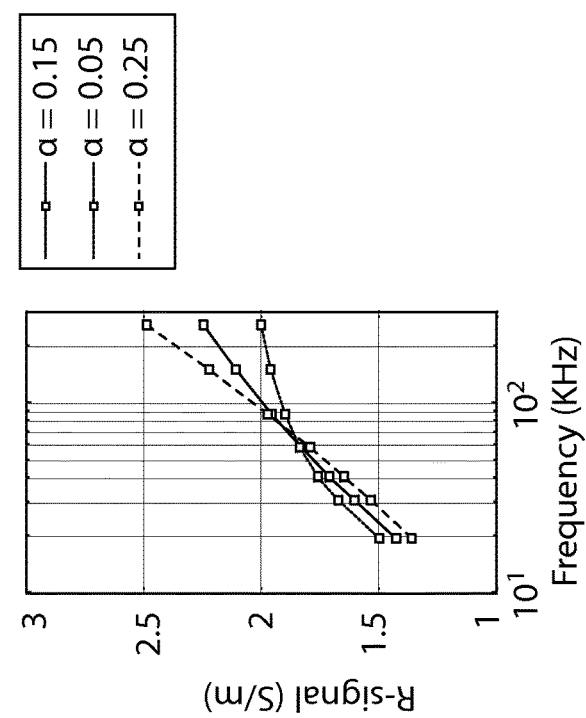

FIGS. 6A and 6B illustrate graphs showing R-signal and X-signal responses to variations in frequency dispersion parameters based on an embodiment of a forward modeling technique for quantifying effects of interfacial polarization disclosed herein. An increase in concentration of pyrite may increase the chargeability and time constant. Increases in grain sizes may increase the time constant but decrease the chargeability. Inductive coupling has to be avoided at higher frequencies. An increase in chargeability may cause an increase in phase angle maximum. Wet deposits may have higher chargeability and higher time constants. Metallic IP difference occurs from mineral morphology and texture and not from mineral composition. Disseminated have lower chargeability and time constants compared to vein-like mineralization. When electrical continuity is low between mineral grains, dispersion is at a very high frequency and the time constant is very small. Veined graphite has a long time constant and a high chargeability. For dry deposits, the carbon is low which means that frequency dependence is low, so the phase peaks are broad. An increase in inhomogeneity may reduce the frequency dispersion parameter. This parameter may be around 0.75-0.96 for homogeneously distributed disseminated graphite samples.

The time constant is relaxation time. The time constant may be directly proportional to square of distance between mineral grains. The frequency dispersion factor is the decay coefficient.

Qualitative Interpretation

Anomalies in thin beds and depth misalignment issues may be removed using a tensor tool and using curves with the same vertical resolution. Poor borehole conditions, hydrocarbon reservoirs, low-porosity intervals, volcanic, and evaporites and cemented formations can produce anomalous log (R/X)f values.

Quantitative Deliverables

Figures 7A, 7B:
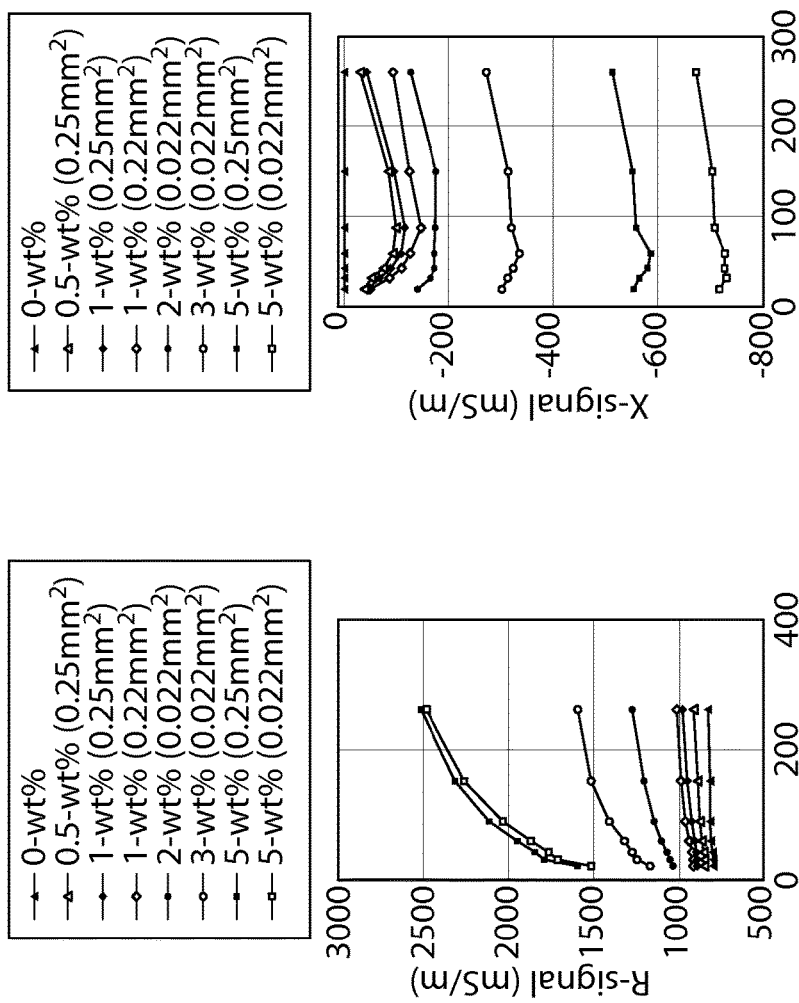
FIGS. 7A and 7B depict laboratory results of R-signal and X-signal responses to variations in volume fraction of graphite flakes.
Figure 8A:
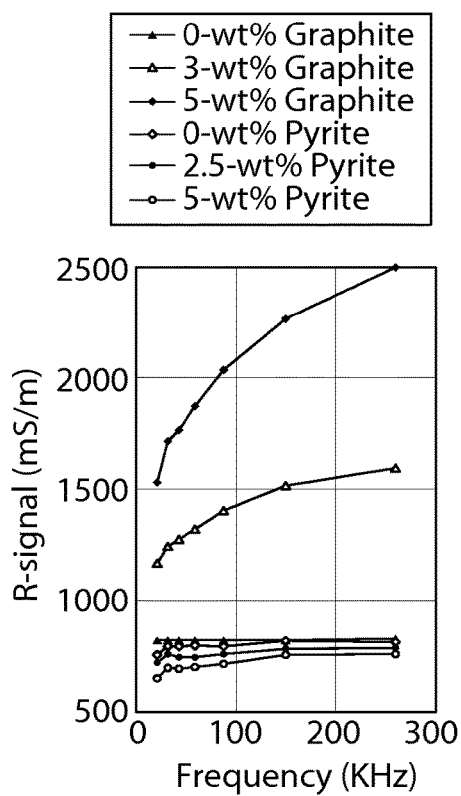
FIGS. 8A and 8B depict laboratory results of R- and X-signal response to variation in volume fraction of graphite flakes and pyrite grains.
Figure 8B:
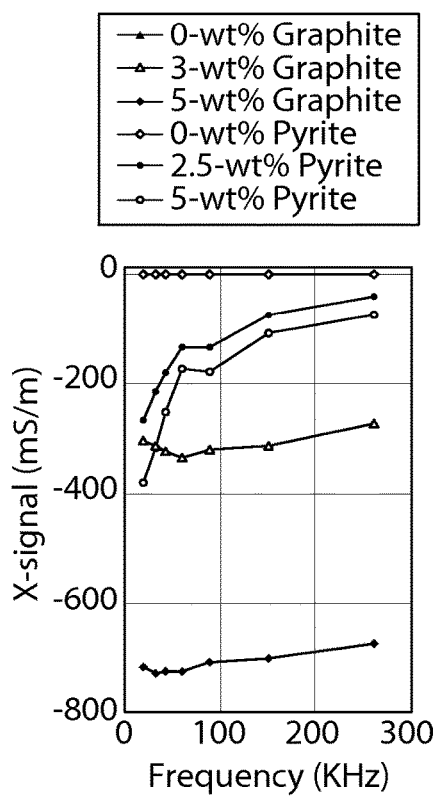

FIGS. 7A and 7B depict laboratory results of R-signal and X-signal responses to variations in volume fraction of graphite flakes. FIGS. 8A and 8B depict laboratory results of R- and X-signal response to variation in volume fraction of graphite flakes and pyrite grains.

A standalone continuous estimation of LOM of shale gas formations can be generated, which can be further interpreted with other supporting logs to obtain continuous TOC values. A distinct relationship of R-signal and X-signal frequency dispersions of pyrite and graphite allows a quick-look insight into the LOM of the shale formation, as the LOM is directly proportional to graphite concentration.

Figure 9A:
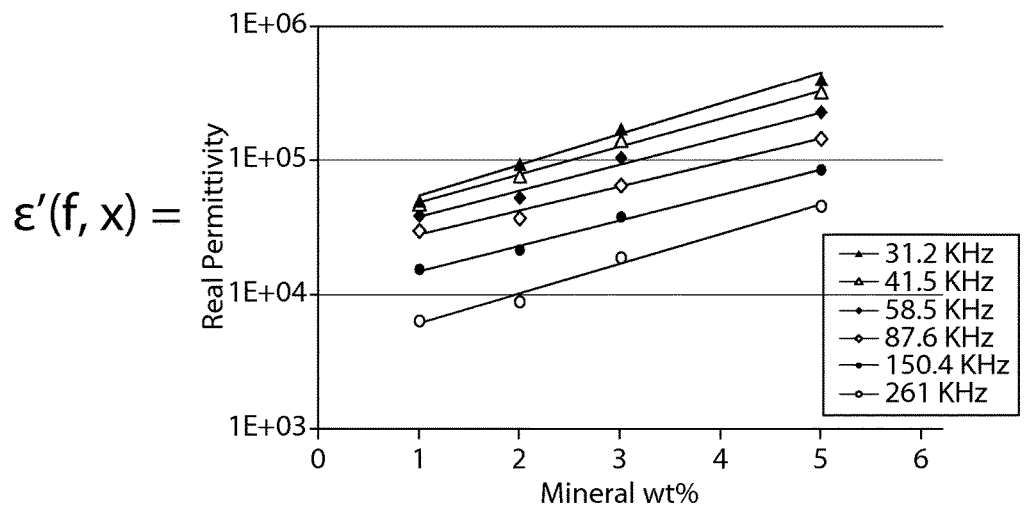
FIGS. 9A and 9B depict correlations of estimated relative permittivity and estimated dielectric loss factors for a medium containing dispersed graphite flakes based on laboratory measurements and its inversion using a TILTECC-based forward model and a COMSOL-based forward model.
Figure 9B:
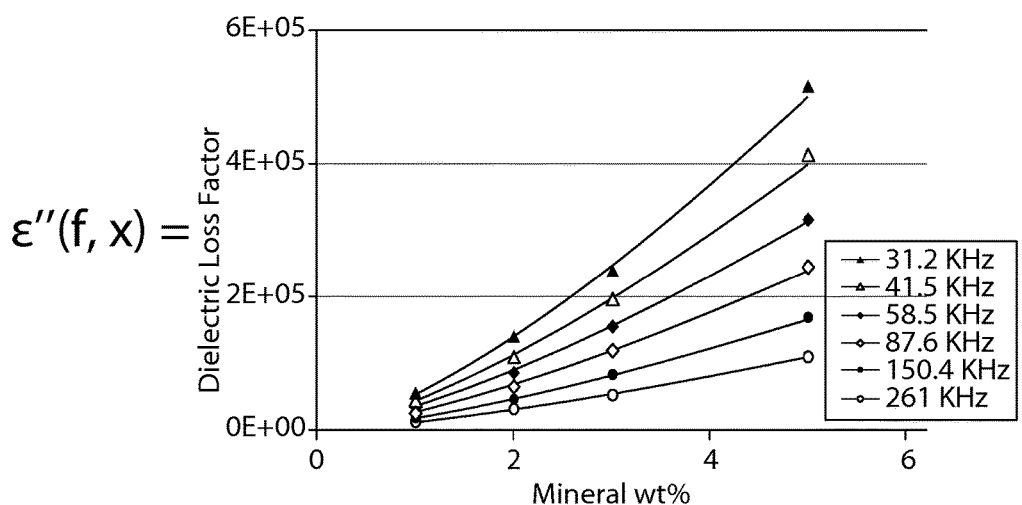

FIGS. 9A and 9B depict correlations of estimated relative permittivity and estimated dielectric loss factors for a medium containing dispersed graphite flakes based on laboratory measurements and its inversion using a TILTECC-based forward model and a COMSOL-based forward model. The multifrequency complex conductivity data, derived from the WHIT or downhole EM tools, may be inverted to estimate, separately, the volume fraction of graphite, turbostatic carbon nanostructures, and pyrite as a function of depth. Results of this inversion scheme can be validated using lab measurements of the volume fraction or geochemical data from nuclear spectral logging.

Core measurements may be used in the same well or field to correlate the volume fraction of graphite and carbon nanostructures to the LOM log of the shale rock. Laboratory measurements may be used to establish the relationship of graphite and carbon nanostructure concentration to the LOM log.

Graphite and carbon nanostructure volume fractions at each depth can be converted to an LOM log. The LOM log can be validated using S2 content obtained from pyrolysis or vitrinite reflectance of core samples. LOM log can also be validated using values of HI from the log response.

The alteration of EM response due to the volume fraction of electrically-conductive phases other than water may be quantified and used to correct the EM response to obtain accurate resistivity values (Rcorr.). The TOC calculation can now be performed using the Passey et al. TOC equation:

$$TOC = (\Delta \log R_{corr.}) \times 10^{(2.297 - 0.1688 \times LOM_{log})}$$

This TOC can be validated using measurements of pulsed neutron logging devices or from correlations using uranium logs or density logs.

Qualitative Deliverables

Figure 10A:
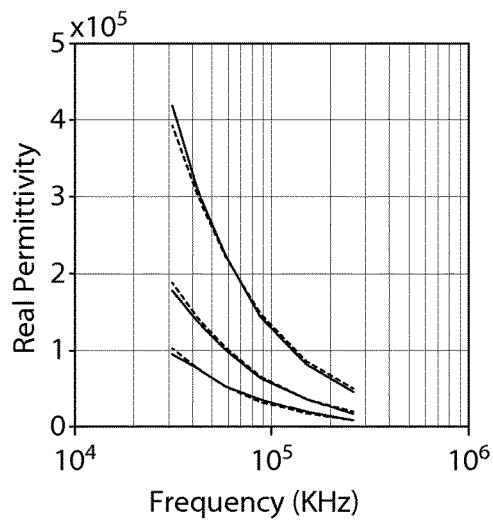
FIGS. 10A and 10B show the agreement of Cole-Cole modeling results and estimated relative permittivity and estimated dielectric loss factors for a medium containing dispersed graphite flakes based on laboratory measurement and its inversion using a TILTECC-based forward model and a COMSOL-based forward model.
Figure 10B:
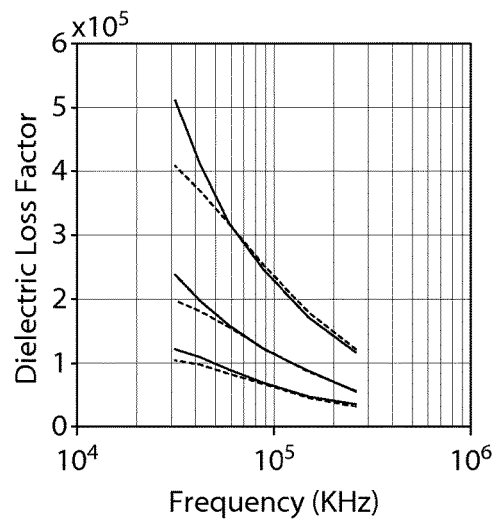

Complex conductivity dispersion can be used for rock typing in a shale gas formation. Experimental correspondence between the proposed electrical rock types and their complex conductivity behavior was demonstrated. Based on the laboratory results and modeling work, the quick-look shale gas electrical rock typing scheme plotted in FIGS. 10A and 10B was proposed. Complex conductivity tensor measurements may be used to obtain directional conductivity and dielectric properties for further electrical rock classification schemes into vuggy, fractured, veined, or laminated systems.

Figure 11:
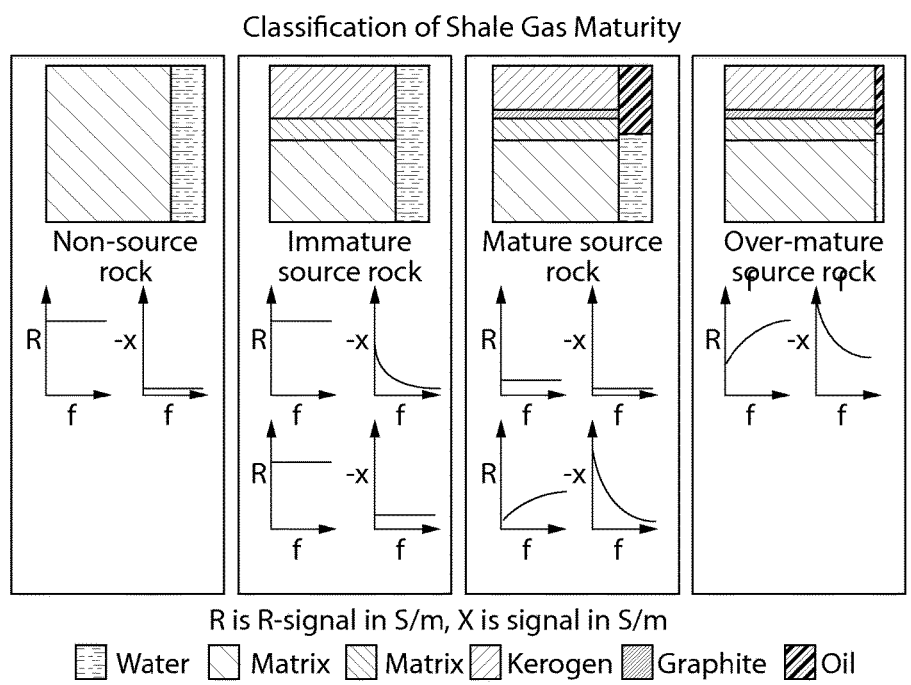
FIG. 11 shows electrical rock typing of a shale gas formation based on multifrequency complex conductivity responses to shale gas maturity.
Figure 12:
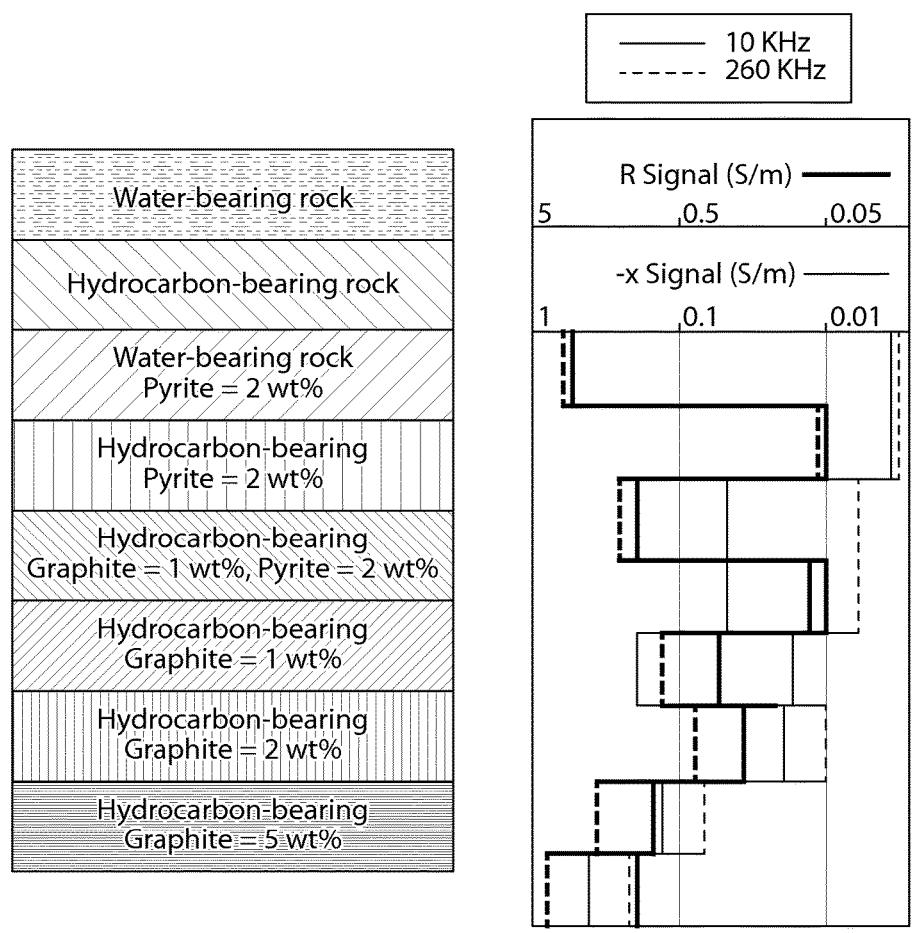
FIG. 12 shows electrical rock typing of a shale gas formation using an overlay method based on multifrequency complex conductivity measurements.

FIG. 11 shows electrical rock typing of a shale gas formation based on multifrequency complex conductivity responses to shale gas maturity, and FIG. 12 shows electrical rock typing of a shale gas formation using an overlay method based on multifrequency complex conductivity measurements. In low maturity source rock (e.g., zone-4 from top), separation exists because of the (−)X-signal that attains a high value at low frequencies and a comparatively very low value at higher frequencies. This kind of a separation may be an indicator of pyritization of the source rock. In high-maturity source rock (e.g., zone-6 & zone-7 from top), where there is presence of carbon nanostructures and graphite, separation between R- and (−)X-signals increases with increasing frequency and both R- and (−)X-signals may be sensitive to frequency. With an increase in LOM, the separation between the R- and (−)X-signals at low frequencies increases and the separation between R- and (−)X-signals at high frequencies diminishes.

This quick-look electrical rock-typing method uses complex conductivity measurements, which are obtained at at least two different frequencies. One frequency may be 10 times greater than the other frequency.

A base line condition exists when the R-signal and (−)X-signal curves or the estimated resistivity and relative permittivity values for the frequencies overlay each other. This baseline may indicate non-source rock. The physics of complex conductivity measurements and polarization in non-source water-bearing formation may dictate the overlap of the curves.

The R- and (−)X-signals may be mathematically scaled for the purpose of interpretability so that the curves intersect in a clean water bearing rock. With the baseline established, in agreement with the physics of the effects of interfacial polarization, the relative separation and non-parallelism of the multifrequency resistivity and permittivity curves (or R- and (−)X-signal) can be qualitatively interpreted as organic-rich or organic-lean, as mature or non-mature, as water-bearing or hydrocarbon-bearing, and as pyrite-bearing or graphite-bearing or clean.

The log (R/X)f curve is a function of graphitic and pyritic composition, which is related to the maturity of the TOC based on the pyritization and graphitization of the source rock. So, log (R/X)f may be a subsurface indicator of Level of Organic Metamorphism ("LOM"). Log (R/X)f=log 10(R/Rbaseline)−log 10(X/Xbaseline) at a given frequency.

Using the LOM determination from a core analysis and a LOM-log (R/X)f relationship, variability of the LOM in subsurface can be characterized. A LOM of 7 corresponds to an onset of maturity, and a LOM of 12 corresponds to an onset of over-maturity.

Each separate interval of interest may have a distinct baseline for the R- and X-signals. A GR-cutoff may distinguish between organic-rich source rocks and hydrocarbon-bearing reservoir intervals for the TOC profile estimation. Baselines of R-signals at multiple frequencies may be used to remove porosity dependence. Once a baseline is established for the R-signals in a given lithology, the porosity variation may affect the responses of the R-signal curves such that a shift in one curve is reflected in a shift of comparable proportional magnitude in the other curve(s).

An appropriate scaling of the R-signal curves can remove porosity dependence, allowing for the calculation of LOM in wells. The ability to perform the log (R/X)f technique at a well site using properly scaled R-signal and X-signal curves provides an excellent method for identifying organic-rich intervals to be sampled with a side-wall coring tool.

Figure 13:
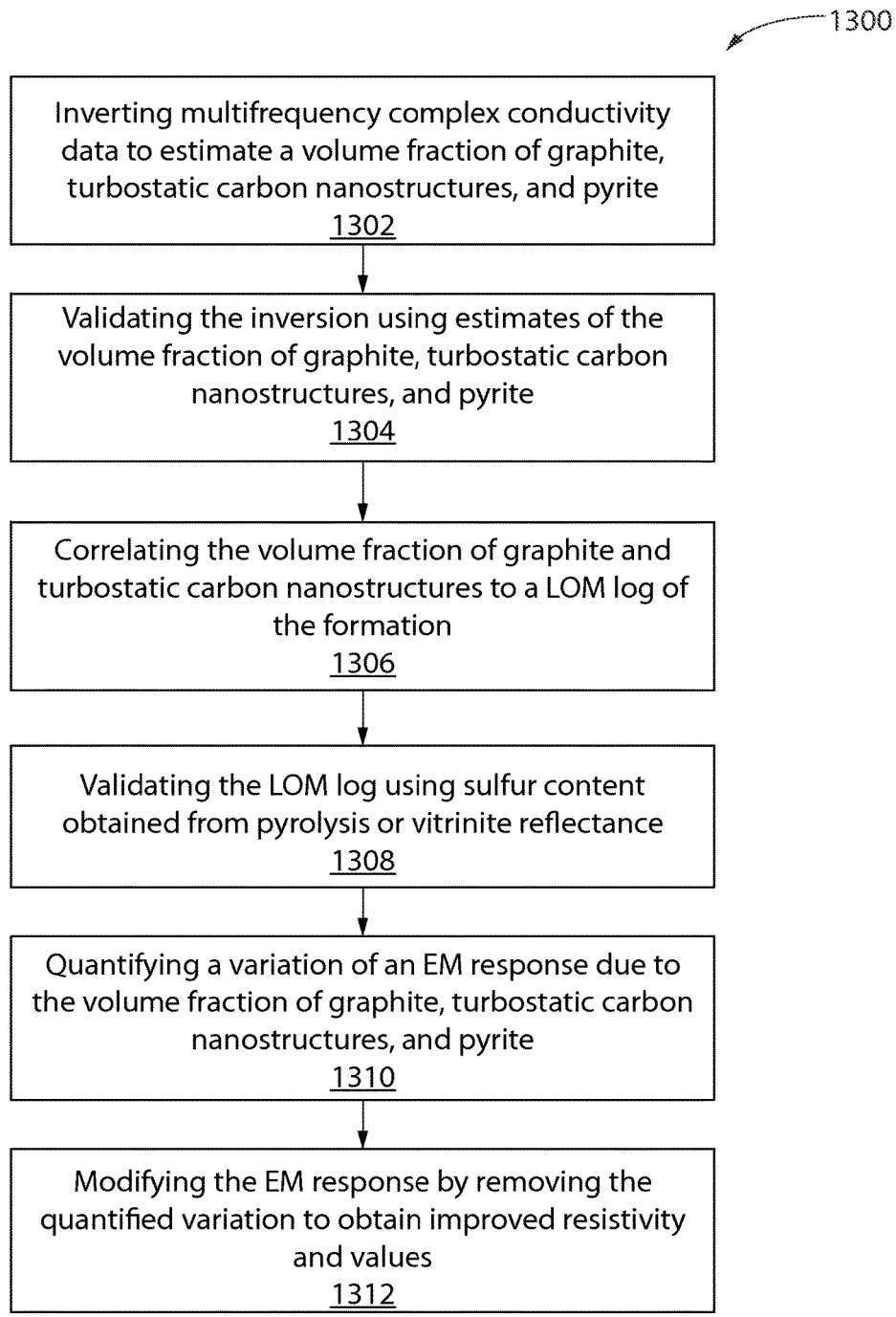
FIG. 13 illustrates a flowchart of a method for determining a level of organic maturity of a shale gas formation.

FIG. 13 illustrates a flowchart of a method 1300 for determining a level of organic maturity of a shale gas formation, according to an embodiment. The method 1300 may include inverting multifrequency complex conductivity data to estimate a volume fraction of graphite, turbostatic carbon nanostructures, and pyrite as a continuous well log at various depths of the formation, as at 1302. The method 1300 may also include validating the inversion of the multifrequency complex conductivity data using estimates of the volume fraction of graphite, turbostatic carbon nanostructures, and pyrite obtained from geochemical and other relevant well-log and core data, as at 1304. The method 1300 may also include correlating the volume fraction of graphite and turbostatic carbon nanostructures to a level of organic maturity log of the shale gas formation using a (first) plurality of core measurements, as at 1306. The method 1300 may also include validating the level of organic maturity log using sulfur content obtained from pyrolysis or vitrinite reflectance of a (second) plurality of core measurements, as at 1308. The method 1300 may also include quantifying a variation of an electromagnetic response comprising electrical conductivity and dielectric permittivity due to the volume fraction of graphite, turbostatic carbon nanostructures, and pyrite, as at 1310. The method 1300 may also include modifying the electromagnetic response by removing the quantified variation to obtain improved resistivity and permittivity values that may be used to estimate water saturation and TOC, as at 1312. In response to the modified electromagnetic response, a user may vary a direction that a downhole tool drills in the formation (i.e., directional drilling) to stay in, or move toward, the portion of the formation with higher LOM (e.g., an LOM greater than a predetermined value), thereby improving the exposure of the wellbore to hydrocarbon reserves. Thus, using the modified electromagnetic response, the user may steer away from overmature rocks containing graphite and turbostatic carbon nanostructures to stay within pyrite-rich hydrocarbon-bearing rocks. In addition, using the modified electromagnetic response, the user may plan to drill lateral wells into zones in the formation that are rich in mature organics and avoid overmature zones.

Figure 14:
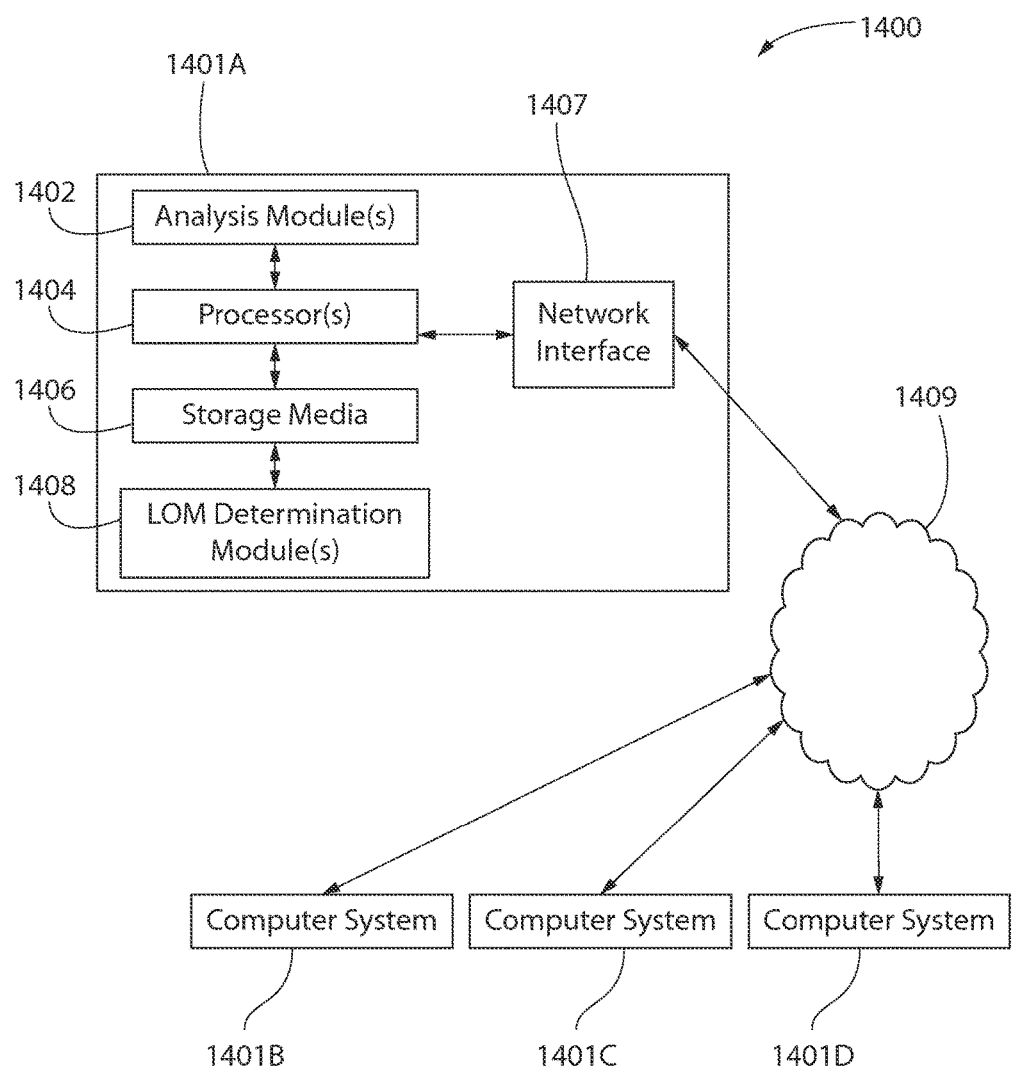
FIG. 14 illustrates a computing system for performing the method.

FIG. 14 illustrates a computing system 1400 for performing the method 1300. The computing system 1400 may include a computer or computer system 1401A, which may be an individual computer system 1401A or an arrangement of distributed computer systems. The computer system 1401A may be in a downhole tool (e.g., a logging-while-drilling tool or a measurement-while-drilling tool), or the computer system 1401A may be at the surface. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor may include a microprocessor, microcontroller, processor module or subsystem, programmable integrated circuit, programmable gate array, or another control or computing device.

The storage media 1406 may be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1400 contains one or more LOM determination module(s) 1408. The LOM determination module 1408 may be used to perform at least a portion of the method 1300 herein.

It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the at least a portion of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A method for drilling a well in a subsurface shale gas formation, the method comprising:
    causing a downhole tool to drill the well in a subsurface shale gas formation;
    making multifrequency complex conductivity tensor measurements of the shale gas formation while drilling the well;
    inverting the multifrequency complex conductivity tensor measurements to estimate a volume fraction of graphite, turbostatic carbon nanostructures, and pyrite in the shale gas formation;
    correlating the volume fraction of graphite and turbostatic carbon nanostructures in the shale gas formation to a level of organic maturity log of the shale gas formation;
    validating the level of organic maturity log using sulfur content obtained from pyrolysis or vitrinite reflectance of a core sample acquired from the shale gas formation;
    running a forward model to quantify a variation of an electrical conductivity and dielectric permittivity of the shale gas formation due to the volume fraction of graphite, turbostatic carbon nanostructures, and pyrite;
    modifying the electrical conductivity and dielectric permittivity of the shale gas formation by removing a quantified variation to obtain improved electrical conductivity and dielectric permittivity values for the shale gas formation; and
    varying a direction that the downhole tool drills the well in the shale gas formation in response to the improved electrical conductivity and dielectric permittivity values to stay in or move toward a portion of the shale gas formation having a level of organic maturity that is greater than a predetermined value.

2. The method of claim 1, wherein inverting the multifrequency complex conductivity tensor measurements to estimate the volume fraction of graphite, turbostatic carbon nanostructures, and pyrite comprises inverting the multifrequency complex conductivity tensor measurements to estimate the volume fraction of graphite, turbostatic carbon nanostructures, and pyrite represented as a continuous well log at various depths of the shale gas formation.

3. The method of claim 1, further comprising validating the inversion of the multifrequency complex conductivity tensor measurements using estimates of the volume fraction of graphite, turbostatic carbon nanostructures, and pyrite obtained from geochemical well-log and core data.

4. The method of claim 1, wherein the volume fraction of graphite and turbostatic carbon nanostructures is correlated to the level of organic maturity log of the shale gas formation using measurements of a first plurality of core samples acquired from the shale gas formation.

5. The method of claim 4, wherein validating the level of organic maturity log using sulfur content obtained from pyrolysis or vitrinite reflectance comprises validating the level of organic maturity log using the sulfur content obtained from pyrolysis or vitrinite reflectance of a second plurality of core samples acquired from the shale gas formation.

6. The method of claim 1, further comprising estimating a water saturation level in the shale gas formation using the improved electrical conductivity and dielectric permittivity values.

7. The method of claim 1, further comprising estimating a total organic carbon level in the shale gas formation using the improved electrical conductivity and dielectric permittivity values.

8. The method of claim 7, further comprising drilling a subsequent lateral well into a portion of the shale gas formation having the level of organic maturity that is greater than a predetermined value.

9. The method of claim 1, wherein the direction is varied to steer away from overmature portions of the shale gas formation containing graphite and turbostatic carbon nanostructures to stay within a pyrite-rich hydrocarbon-bearing portion of the shale gas formation.

10. A well drilling system, comprising:
a downhole tool configured to drill a well;
a logging while drilling tool configured to make multifrequency complex conductivity tensor measurements of a shale gas formation through which the well penetrates;
one or more processors; and
a memory system comprising one or more non-transitory computer-readable media storing instructions that, when executed by at least one of the one or more processors, cause the computing system to perform operations, the operations comprising:
  inverting the multifrequency complex conductivity tensor measurements to estimate a volume fraction of graphite, turbostatic carbon nanostructures, and pyrite in the shale gas formation;
  validating the inversion of the multifrequency complex conductivity tensor measurements using estimates of the volume fraction of graphite, turbostatic carbon nanostructures, and pyrite obtained from a geochemical well-log and measurements of a core sample acquired from the shale gas formation;
  correlating the volume fraction of graphite and turbostatic carbon nanostructures in the shale gas formation to a level of organic maturity log of the shale gas formation;
  validating the level of organic maturity log using sulfur content obtained from pyrolysis or vitrinite reflectance of the core sample;
  running a forward model to quantify a variation of an electrical conductivity and dielectric permittivity of the shale gas formation due to the volume fraction of graphite, turbostatic carbon nanostructures, and pyrite;
  modifying the electrical conductivity and dielectric permittivity of the shale gas formation by removing a quantified variation to obtain improved electrical conductivity and dielectric permittivity values for the shale gas formation; and
  varying a direction that the downhole tool drills the well in the shale gas formation in response to the improved electrical conductivity and dielectric permittivity values to stay in or move toward a portion of the shale gas formation having a level of organic maturity that is greater than a predetermined value.

11. The system of claim 10, wherein inverting the multifrequency complex conductivity tensor measurements to estimate the volume fraction of graphite, turbostatic carbon nanostructures, and pyrite comprises inverting the multifrequency complex conductivity tensor measurements to estimate the volume fraction of graphite, turbostatic carbon nanostructures, and pyrite represented as a continuous well log at various depths of the shale gas formation.

12. The system of claim 10, wherein the volume fraction of graphite and turbostatic carbon nanostructures is correlated to the level of organic maturity log of the shale gas formation using measurements of a first plurality of core samples acquired from the shale gas formation.

13. The system of claim 12, wherein validating the level of organic maturity log using sulfur content obtained from pyrolysis or vitrinite reflectance comprises validating the level of organic maturity log using the sulfur content obtained from pyrolysis or vitrinite reflectance of a second plurality of core samples acquired from the shale gas formation.

14. The system of claim 10, wherein the operations further comprise estimating a water saturation level in the shale gas formation using the improved electrical conductivity and dielectric permittivity values.

15. The system of claim 10, wherein the operations further comprise estimating a total organic carbon level in the shale gas formation using the improved electrical conductivity and dielectric permittivity values.

16. The system of claim 10, wherein a direction that the downhole tool drills the well in the shale gas formation in response to the improved electrical conductivity and dielectric permittivity values.

\* \* \* \* \*